June 5, 1923.
M. B. STROUT
MOVABLE HEADLIGHT
Filed June 21, 1922
1,458,084
2 Sheets-Sheet 1
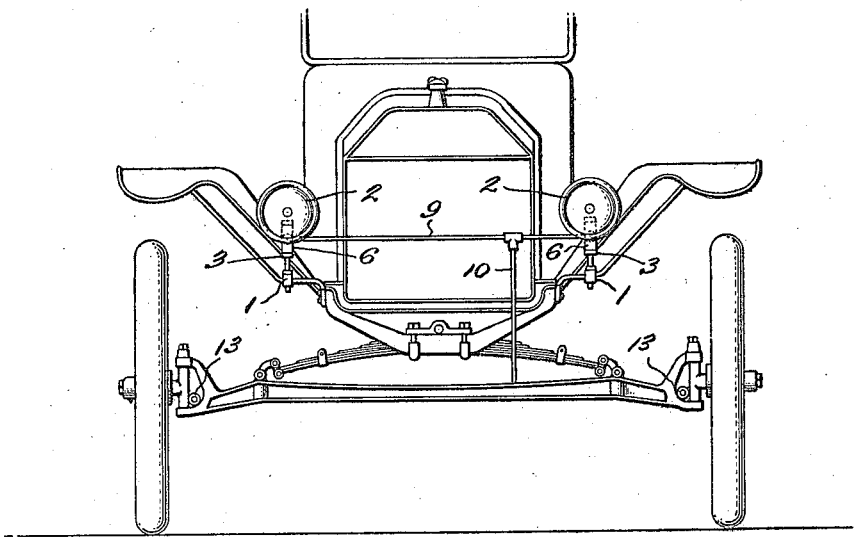
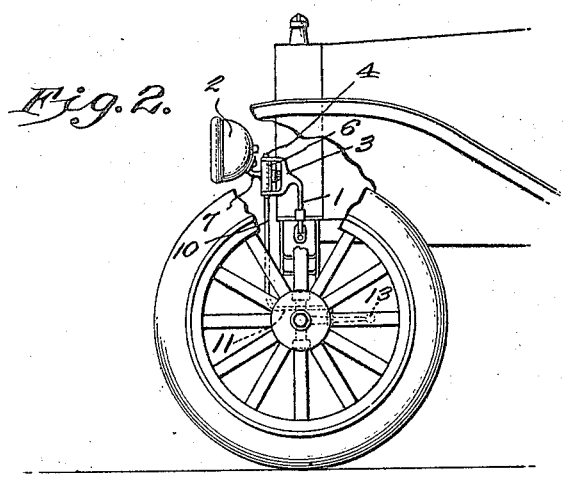
M. B. Strout,
INVENTOR
BY Victor J. Evans
ATTORNEY
WITNESS:

June 5, 1923.
M. B. STROUT
MOVABLE HEADLIGHT
Filed June 21, 1922
1,458,084
2 Sheets-Sheet 2
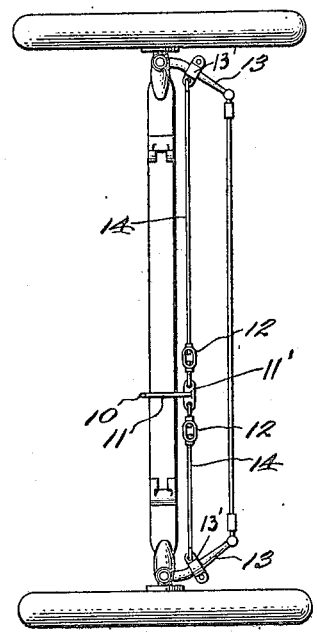
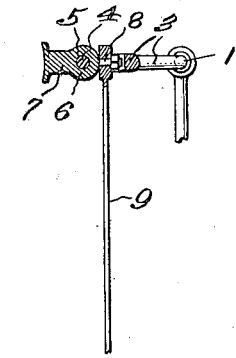
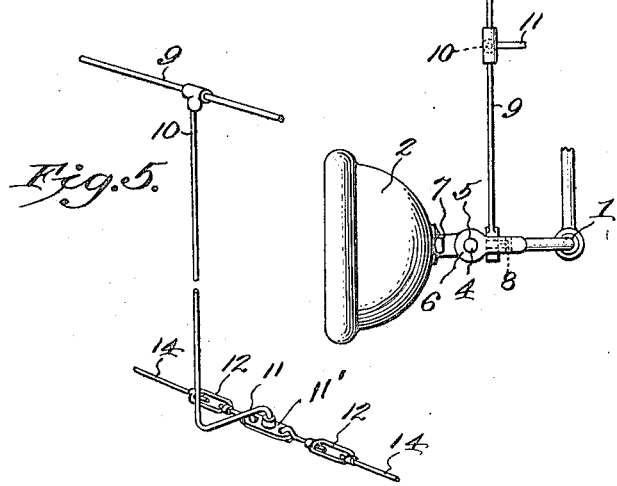

Patented June 5, 1923.

1,458,084

UNITED STATES PATENT OFFICE.

MYRON BURNHAM STROUT, OF POLAND, MAINE.

MOVABLE HEADLIGHT.

Application filed June 21, 1922. Serial No. 569,905.

*To all whom it may concern:*

Be it known that I, MYRON B. STROUT, a citizen of the United States, residing at Poland, in the county of Androscoggin, and State of Maine, have invented new and useful Improvements in Movable Headlights, of which the following is a specification.

This invention relates to dirigible headlights for motor vehicles, the general object of the invention being to provide means whereby the movement of the front wheels of the vehicle will be communicated to the headlights so that the rays of light will follow the road on curves as well as on straight portions.

Another object of the invention is to make the parts adjustable to cause the rays of light to be directed in the proper direction.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a front view of an automobile showing my invention in use.

Figure 2 is a side view.

Figure 3 is a plan view of the front part of the chassis.

Figures 4 and 5 are detail views.

In these views 1 indicates the lamp supporting standards of the automobile and 2 the lamps thereof. In carrying out my invention I place a casting 3 on the upper end of each standard, the casting carrying a vertical bolt 4 which is arranged to pass through a vertical opening 5 formed in the casting 6 which is connected with the lamp 2 by the arm 7. The casting 6 is also provided with a rearwardly extending arm 8 which extends into the casting 3 and a link 9 connects the two arms 8 of the two castings 6 together so that the movement of one lamp well be communicated to the other. A vertically arranged rod 10 has its upper end suitably connected with the link 9 and the lower end of this rod 10 is bent so that it extends under the front of the automobile, as shown at 11. A pair of turn buckles 12 are connected with said bent end by means of a plate 11' and each turn buckle is connected to a steering arm 13 of the car by a link 14.

From the foregoing it will be seen that when the steering mechanism of the car is manipulated to turn the front wheel the movement of the steering arms 13 will be communicated to the part 11 of the rod 10 through the links 14 and turn buckles, thus moving the rod 10 bodily and as this rod 10 is connected with the link 9 said link will be moved longitudinally in one direction or the other and thus the lamps will be rocked on their pivotal bolts 4 which pass through the castings 6. The rays of light will thus be caused to follow the road as the car is making a turn or taking a curve, thus properly illuminating the road ahead at all times. By having the turn buckles connected with the links these links can be adjusted so that the lamps will be moved to the desired extent. The amount of movement can also be adjusted by fastening the links to different parts of the arms 13 by clamps 13'.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a motor vehicle and its head lamps, a pair of castings carried at the front of the car, a vertically arranged bolt in each casting, a casting connected with each head lamp and having a vertically arranged opening therein for receiving a bolt, a projection arranged on each casting of the lamps and extending into the space within the first mentioned casting, a link having its ends engaging said projections, a rod having its upper end connected with said link and its lower end bent to extend under the vehicle, a plate connected with said bent end, turn buckles connected with the plate, clamps on the steering arms and links connecting the turn buckles with said clamps.

In testimony whereof I affix my signature.

MYRON BURNHAM STROUT.